United States Patent [19]

Amada et al.

[11] Patent Number: 4,975,919
[45] Date of Patent: Dec. 4, 1990

[54] LASER WAVELENGTH CONTROL APPARATUS

[75] Inventors: Yoshiho Amada; Osamu Wakabayashi; Masahiko Kowaka, all of Kanagawa, Japan

[73] Assignee: Kabushiki Kaisha Komatsu Seisakusho, Tokyo, Japan

[21] Appl. No.: 296,120
[22] PCT Filed: Mar. 18, 1988
[86] PCT No.: PCT/JP88/00293
§ 371 Date: Nov. 17, 1988
§ 102(e) Date: Nov. 17, 1988
[87] PCT Pub. No.: WO88/07276
PCT Pub. Date: Sep. 22, 1988

[30] Foreign Application Priority Data

Mar. 19, 1987 [JP] Japan .................................. 62-64923

[51] Int. Cl.$^5$ ................................................ H01S 3/00
[52] U.S. Cl. ........................................ 372/33; 372/32; 372/99
[58] Field of Search ...................... 372/28, 32, 34, 57, 372/98, 99, 33

[56] References Cited

U.S. PATENT DOCUMENTS 4,150,342  4/1979  Johnston, Jr. et al. ............... 372/32
4,829,536  5/1989  Kajiyama et al. ..................... 372/57

Primary Examiner—Frank Gonzalez
Attorney, Agent, or Firm—Diller, Ramik & Wight

[57] ABSTRACT

According to present invention, the central wavelength of the central wave of the output laser beam, and the sideband wave power or central wave power of the output laser beam are detected, and the wavelength selective characteristics of wavelength selective elements disposed between a laser chamber and a rear mirror are controlled such that the detected central wavelength falls within a desired allowable range and that the detected power becomes minimum or maximum.

17 Claims, 6 Drawing Sheets

4,975,919

LASER WAVELENGTH CONTROL APPARATUS

TECHNICAL FIELD

The present invention relates to laser wavelength control apparatus and, more particularly, to such apparatus for a narrow-band oscillation excimer laser suitable for use as a light source of a reduction projection aligner.

BACKGROUND ART

The use of an excimer laser as a light source of a reduction projection aligner for semiconductor device production attracts public attention. This is because many excellent advantages are expected: i.e., there is the probability that the limit of the resolution will be enhanced to less than 0.5 um since the wavelength of the excimer laser is short (the wavelength of a KrF laser is about 248.4 nm); the depth of the focus is great compared to the g-and i-lines from a mercury lamp used conventionally with the same resolution: the numerical aperture (NA) of a lens may be reduced; a large exposure area is available, high power is available, etc.

However, there are two big problems to be solved when the excimer laser is used as the light source of a reduction projection aligner.

One is that since the wavelength of the excimer laser is short, namely, 248.35 nm, the materials transparent to this wavelength are only quartz, $CaF_2$ and $MgF_2$, and only quartz can be used as the lens material among these named materials from a standpoint of uniformness and working accuracy. Therefore, it is impossible to design a reduction projection lens with corrected chromatic aberration. Thus, it is necessary to narrow the bandwidth of the excimer laser to such an extent that the chromatic aberration is negligible.

The other problem is how to suppress a speckle pattern produced by narrowing the excimer laser band and how to suppress a reduction of power produced by narrowing the band.

There is a technique of narrowing the excimer laser band called an injection locking system. This system includes wavelength selective elements (an etalon, a diffraction grating, a prism, etc.,) disposed within a cavity of an oscillator stage. The system is oscillated in a single mode by limiting a spatial mode using a pinhole, the laser beam is injection synchronized by an amplifier stage. Thus, the output beam is high in coherency. If this output beam is used as a light source for the reduction aligner, a speckle pattern will be generated. Generally, the generation of a speckle pattern is considered to be dependent on the number of spatial transverse modes contained in the laser beam. It is known that if the number of spatial transverse modes contained in the laser beam decreases, a speckle pattern becomes likely to be generated whereas if the number of spatial transverse modes increases, the speckle pattern becomes less likely to be generated. The injection locking system is a technique of narrowing the band essentially by greatly reducing the number of spatial transverse modes. However, the generation of a speckle pattern is a big problem, so that the injection locking system cannot be employed in a reduction projection aligner.

A promising technique of narrowing the excimer laser band uses etalons which is a wavelength selective element. As a conventional technique using etalons, AT & T Bell Laboratories has proposed a technique of narrowing the excimer laser band by disposing etalons between a front mirror and a laser chamber of the excimer laser. However, there is the problem that in this system the spectral profile cannot be narrowed so greatly, and that power loss is large due to insertion of the etalon, and the drawback that the number of spatial transverse modes cannot be increased so greatly.

Inventors have succeeded in obtaining a laser beam having an output of about 50 mJ per pulse by uniformly narrowing the spectral width to within about 0.003 nm in full width at the half maximum over whole beam size of $20 \times 10$ mm in which an etalon having a large effective diameter (of about dozen millimeters) is disposed between the rear mirror and laser chamber of the excimer laser. By employing the structure in which the etalon is disposed between the rear mirror and the laser chamber of the excimer laser, essential problems required for a light source for a reduction projection aligner including narrowing the laser band, ensuring the number of spatial transverse modes, and reduction of the power loss due to insertion of the etalon have been solved.

Although the structure in which the etalon is disposed between the rear mirror and laser chamber of the excimer laser has excellent advantages such as narrowing the band, ensuring the number of spatial transverse modes, and reduction of the power loss, power transmitting through the etalon is very high, so that physical changes fluctuations in the etalon temperature will occur. Therefore, there is the problem that the central wavelength of the oscillated output laser beam may fluctuate and the power may be greatly reduced. This tendency is especially remarkable in the use of two or more etalons with different free spectral range for narrowing the band.

It is an object of the present invention to provide in a laser having a structure in which a wavelength selective elements are disposed between the rear mirror and the laser chamber of the laser a laser wavelength control apparatus in which the central wavelength of the output laser beam is locked with high accuracy to reduce fluctuations of the laser power to thereby provide a stabilized output.

DISCLOSURE OF THE INVENTION

In order to achieve the above object, according to the present invention, the central wavelength of the central wave and the power of the sideband waves of the the output laser beam are detected, and the wavelength selective characteristic of wavelength selective elements disposed between the laser chamber and the rear mirror of the laser is controlled such that the detected central wavelength falls in a desired allowable range and that the power of the detected sideband waves falls in a desired allowable range (a minimum value).

Thus, according to the present invention, there is provided a laser wavelength control apparatus in which at least two wavelength selective elements are disposed between a laser chamber and a rear mirror of the laser, and the central wavelength and spectral profile of the output laser beam are controlled by controlling the respective wavelength selective characteristics of the wavelength selective elements, characterized by means for detecting the central wavelength of the central wave of the output laser beam and detecting the power of the sideband waves of the output laser beam; first control means for controlling the wavelength selective characteristics of the wavelength selective elements such that the value of the central wavelength detected by the detecting means falls within a first desired allowable range; and second control means for controlling the wavelength selective characteristics of the wavelength selective elements such that the value of the sideband wave power detected by the detecting means falls within a second allowable range.

According to the present invention, the central wavelength and power of the central wave of the output laser beam are detected, and the wavelength selective characteristic of wavelength selective elements or etalons disposed between the laser chamber and the rear mirror of the laser is controlled such that the detected central wavelength falls in a desired allowable range and that the detected power becomes a maximum value.

Thus, according to the present invention, there is also provided a laser wavelength control apparatus in which two etalons with different free spectral range are disposed between a laser chamber and a rear mirror of the laser, and the wavelength selective characteristics of the etalons are controlled to control the central wavelength and spectral profile of the output laser beam, characterized by means for detecting the central wavelength and central wavelength power of the output laser beam; first control means for controlling the wavelength selective characteristic of at least one, with smaller free spectral range, of the etalons such that the central wavelength detected by the detecting means falls within a desired allowable range; and second control means for controlling the wavelength selective characteristic of at least one, with larger free spectral range, of the etalons such that the central wavelength power detected by the detecting means becomes maximum.

In the present invention, reference generating means which generates a reference beam having a predetermined wavelength is used in the detection of the central wavelength.

Thus, according to the present invention, there is provided a laser wavelength control apparatus in which at least one wavelength selective element is disposed between a laser chamber and a rear mirror of the laser, and the central wavelength and spectral profile of the output laser beam are controlled by controlling the respective wavelength selective characteristics of these wavelength selective elements, characterized by reference beam generating means for generating a reference beam having a reference wavelength, detecting means for receiving the output laser beam together with the reference beam and for detecting the central wavelength of the output laser beam from a relative wavelength difference relative to the reference beam; and control means for controlling the wavelength selective characteristics of the wavelength selective elements such that the central wavelength detected by the detecting means falls within a desired allowable range.

BEST MODE FOR CARRYING OUT THE INVENTION

Figure 1:
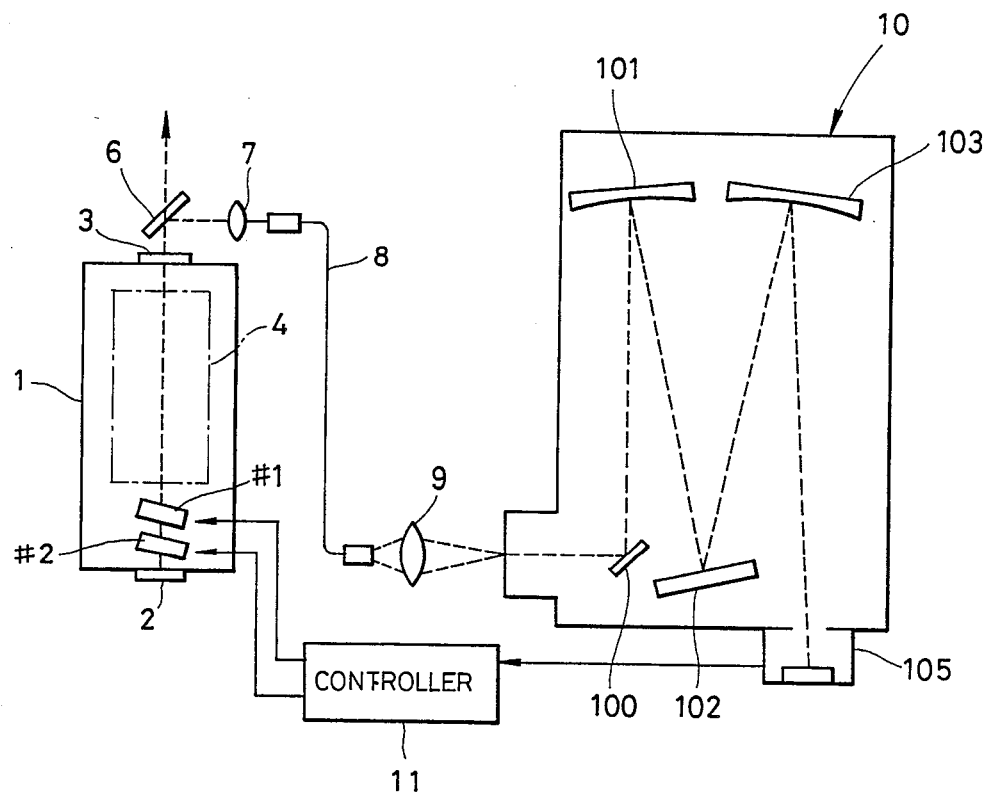
FIG. 1 is a block diagram showing one embodiment of the present invention.

FIG. 1 is a block diagram showing one embodiment of the present invention. A laser device 1 has an oscillating circuit in which a rear mirror 2, a front mirror 3 and a laser chamber 4 filled with a laser gas are disposed. Two etalons: i.e., a first etalon #1 and a second etalon #2, are disposed as wavelength selective elements between the rear mirror 2 and the laser chamber 4 such that the oscillated laser beam is output through a half mirror 6 out of the device. The laser beam reflected by the half mirror 6 is entered via a lens 7 into an optical fiber 8 and further input to a spectroscope 10 via a lens 9 provided at the other end of the optical fiber.

The spectroscope 10 has a well-known Czerny-Turner type structure in which incident light is transmitted through a mirror 100, a concave mirror 101, a diffraction grating 102, and a concave mirror 103 in this order. Thus, the central wave (main peak) component and sideband wave (side peak) components are extracted separately, which are then entered into a wavelength detector 105. This detector 105 detects the central wavelength of the output laser beam from the incident central wave component and the power of the sideband wave from the sideband components.

The output signal from the wavelength detector 105 is input to a controller 11, which controls, for example, the respective angles of two etalons #1 and #2 on the basis of the central wavelength and sideband wave power detected by the wavelength detector 105.

Arrangement may be such that other controlled elements such as etalon temperature, gap pressure, and gap spacing can be changed.

FIGS. 2(a)–(d) shows an illustrative structure of the wavelength detector 105. The detector shown in FIG. 2(a) includes a one-dimensional diode array 12, which in turn includes a plurality of photodiodes arranged in a line, as well known. The photodetection position is detected by a photodiode which detects laser beam, namely, a photodetection element (photodetection channel) which produces an output and the power is detected by the level of the output from the photodetection element. Therefore, with the structure of FIG. 2(a), the central wavelength of the output laser beam from the photodetection channel due to the central wave components (shown by the dot-dashed line in FIG. 2(a)) is detected. The sideband wave power may be detected by the output level of the photodetection channel due to the sideband wave components (shown by the broken line in FIG. 2(a)).

Figure 2A:
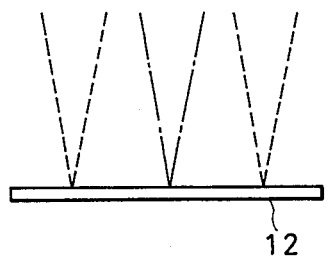
FIGS. 2 are schematics showing an illustrative structure of the wavelength detector.
Figure 2B:
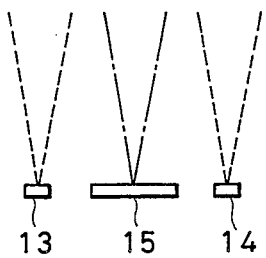

FIG. 2(b) shows a wavelength detector which includes two photodiodes 13 and 14, an one dimensional PSD (Position Sensitive Device) 15. The photodiodes 13 and 14 are disposed at positions where the sideband wave components are detected, and the PSD 15 is disposed at a position where the central wave component is detected. According to the structure of FIG. 2(b), the central wavelength is detected from the output of the PSD 15, and the power of the sideband waves is detected from the outputs of the photodiodes 13 and 14.

Figure 2C:
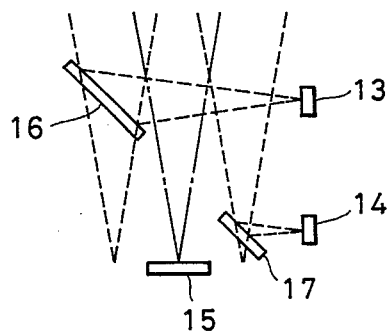

FIGS. 2(c) and (d) each are a wavelength detector suitable for use when the central wave component and the sideband wave components occur close to each other. In FIG. 2(c), the wavelength detector includes photodiodes 13 and 14, PSD 15 and two half mirrors 16 and 17. In the arrangement, the central wave component is detected by the PSD 15, and the central wavelength is detected from the output of the PSD 15. The sideband wave components are detected by the photodiodes 13 and 14 via the half mirrors 16 and 17 and the power of the sideband waves is obtained from the outputs of the photodiodes 13 and 14.

Figure 2D:
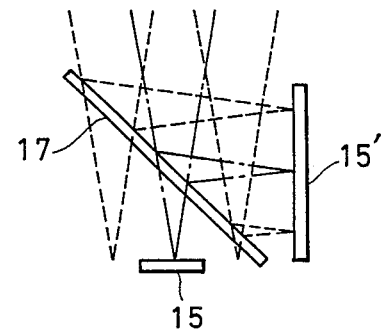

The structure of FIG. 2(d) includes two PSDs 15 and 15' and a single half mirror 17. In the arrangement, the central wave component is detected by the PSD 15, and the central wavelength and the central wave component power are detected from the PSD 15. The central and sideband wave components reflected by the mirror 17 are received by the PSD 15 from which the sum of the central and sideband wave component powers is detected. Therefore, the subtraction of the output of the PSD 15 from the output of the PSD 15' results in the detection of the sideband component power. The etalons #1 and #2 disposed between the rear mirror 2 and the laser chamber 4 are composed of an etalon with large free spectral range and an etalon with small spectral range compared to the etalon #1, respectively. In this case, the central wavelength of the output laser beam is mainly determined by the controlled state of the etalon #2 with small spectral range (the central wavelength does not change greatly by controlling the etalon #1 with small spectral range).

Figure 3A:
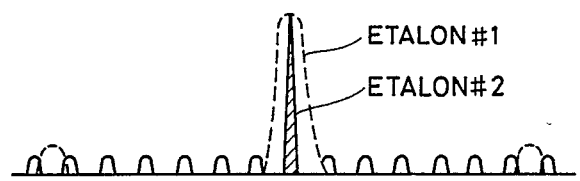
FIGS. 3 are spectral diagrams showing the state in which etalons #1 and #2 are superposed over each other.

FIG. 3 shows that situation. FIG. 3(a) shows the state in which the etalons #1 and #2 are superposed over each other (the selected wavelengths passing through the etalons #1 and #2 coincide and the central wavelength power is maximum). The broken line shows the wavelength spectrum passing through the etalon #1 with large free spectral range while the solid line shows the wavelength spectrum passing through the etalon #2 with small free spectral range.

Figure 3B:
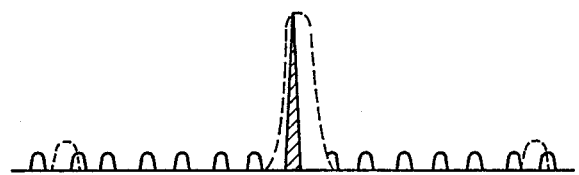

As shown in FIG. 3(b), if the wavelength passing through the etalon #1 shifts and the etalon #1 deviates in position from the etalon #2, the central wave component power decreases and the sideband wave components appear. However, in this case, the central wavelength does not change.

Figure 3C:
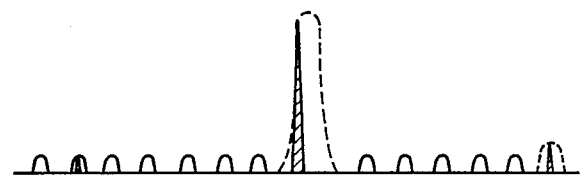

As shown in FIG. 3(c), if the etalon #1 further deviates from the etalon #2, the central wave component power further decreases while the sideband wave component power further increases.

As is obvious from FIG. 3, the central wavelength of the output laser beam is determined by the controlled state of the etalon #2 with small spectral range. When the etalons #1 and #2 are superposed, the sideband wave power is minimum while the central wavelength power is maximum. To the contrary, if the etalons #1 and #2 are not superposed, the sideband wave power is significant while the central wavelength power is small.

In this embodiment, the central wavelength control is performed in which the etalon #2 with small spectral range is controlled on the basis of the central wavelength detected by the wavelength detector 105 to thereby lock the output laser beam to a desired central wavelength, and superposing control is performed in which the etalon #1 with large free spectral range is controlled so as to minimize the sideband wave power detected by the wavelength detector 105 to thereby cause the etalons #1 and #2 to be superposed.

Figure 4:
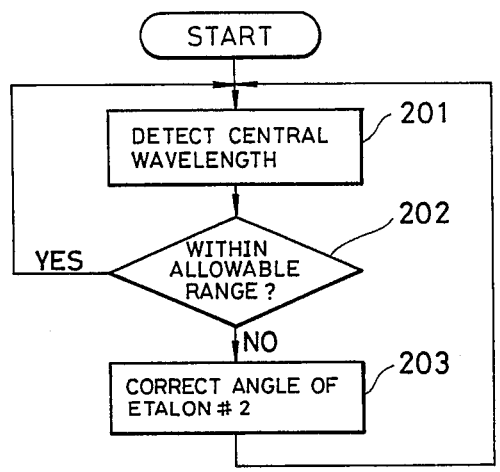
FIGS. 4 are flowcharts showing illustrative control by a controller.
Figure 4:
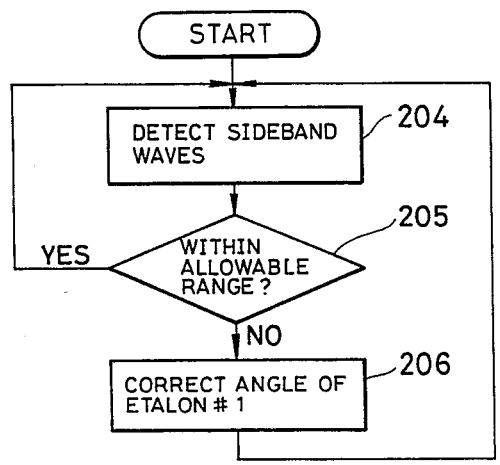

FIGS. 4(a) and (b) illustrate flowcharts in which the etalons #1 and #2 are controlled by the controller 11.

FIG. 4(a) shows the above mentioned central wavelength control. The central wavelength is detected by the wavelength detector 105 (step 201). It is determined whether the detected central wavelength is within an allowable range (step 202). If the central wavelength is out of the allowable range, the angle of the etalon #2 with small free spectral range is adjusted such that the central wavelength falls within the allowable range.

FIG. 4(b) illustrates the above mentioned superposing control. The peak value (power) of the sideband wave component is detected (step 204). If the peak value is out of the allowable range (step 205), the angle of the etalon #1 with large free spectral range is adjusted (step 206) such that the peak value falls within the allowable range.

The central wavelength control shown in FIG. 4(a) and the superposing control shown in FIG. 4(b) are repeated alternately or simultaneously.

Figure 5:
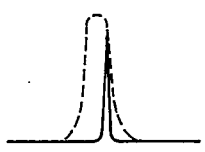
FIGS. 5 and 6 illustrate the relationship between etalon angle and oscillating wavelength.
Figure 5:
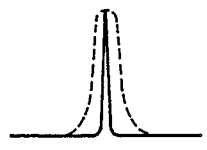
Figure 5:
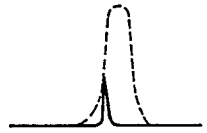
Figure 6:
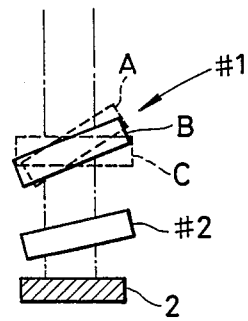

FIGS. 5 and 6 illustrate the state in which the etalons #1 and #2 are subjected to superposing control. Assume now that the angle of the etalon #2 with small free spectral range is fixed as shown in FIG. 6, and that the angle of the etalon #1 with large free spectral range is in the state A. At this time, the central wavelength passing through etalon #1 is on the lower wavelength side of the central wavelength passing through the etalon #2, and the etalons #1 and #2 are not superposed (FIG. 5(a)). Here, if the angle of the etalon #1 is changed from the state A to the state B, the central wavelength passing through the etalon #1 shifts to the higher wavelength side, so that the etalons #1 and #2 are superposed (FIG. 5(b)). If the angle of the etalon #1 is changed from the state B to the state C, the central wavelength passing through the etalon #1 shifts to further higher wavelength side, so that the etalons #1 and #2 are not superposed (FIG. 5(c)). Therefore, in this case, the angle of the etalon #1 may be controlled so as to be in the state C in FIG. 6.

While in the above embodiment the superposing control of the etalons #1 and #2 is performed by controlling the wavelength passing through the etalon #1 such that the sideband wave power falls within a predetermined allowable range, arrangement may instead be such that the central wavelength power is detected and that the wavelength passing through the etalon #1 is controlled in such a manner that the central wavelength power becomes maximum.

Figure 7:
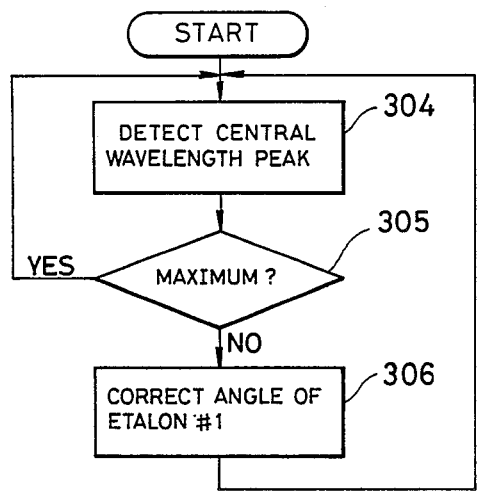
FIG. 7 is a flowchart showing another illustrative control of the controller.

One example of the superposing control in this case is illustrated in the flowchart of FIG. 7. Namely, the peak value (power) of the central wavelength component is detected (step 304). If the peak value is not maximum (step 305), the angle of the etalon #1 with large free spectral range is adjusted (step 306) such that the peak value becomes maximum.

Figure 8:
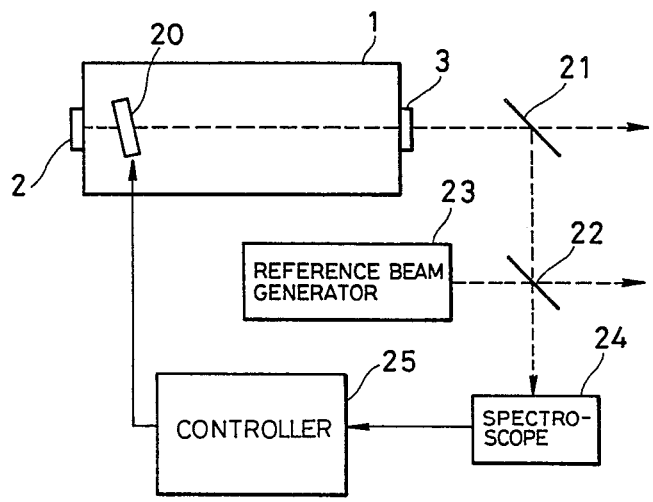
FIG. 8 is a block diagram showing another embodiment using reference light.

FIG. 8 illustrates another embodiment using reference light.

In the particular embodiment, a reference beam generator 23 is provided which generates a light beam having a reference wavelength beam such as argon ion laser beam, a beam having twice the frequency of the argon ion laser beam, or mercury lamp light. The laser beam generated by the laser device 1 is entered into a spectroscope 24 via half mirrors 21 and 22. Simultaneously, the reference light beam from the reference beam generator 23 is entered into the spectroscope 24 via the half mirror 22. The spectrometer 24 detects the central wavelength of the laser beam, using, as a reference, the reference light wavelength separated by spectroscope 24. The controller 25 adjusts the angle of the etalon 20 on the basis of this detected value. Thus it is possible to control the wavelength of the laser beam to a desired absolute wavelength in a stabilized manner.

In that case, the reference beam may be entered periodically into the spectroscope 24.

The laser wavelength control apparatus may be constructed using a monitor etalon instead of the spectroscope 24 in the particular embodiment.

The number of etalons provided between the rear mirror and the laser chamber is not limited to two and may be three or more.

A laser wavelength control apparatus may similarly constructed using other wavelength selective elements instead of etalons.

INDUSTRIAL APPLICABILITY

As described above, according to the present invention, a narrow band output of stabilized power and central wavelength is provided. For example, when a laser to which the present invention is applied is used as a light source of a reduction projection aligner, stabilized focal position, magnification and high resolution are obtained. Furthermore, the exposure time becomes constant and exposure quantity control becomes easy. A laser to which the present invention is applied may be used in medical applications (especially in ophthalmic applications).

We claim:

1. A laser wavelength control apparatus, characterized by:
    a rear mirror comprising a total reflection mirror;
    a front mirror disposed opposite to the rear mirror, for permeating a part of laser beam;
    a laser chamber disposed between the rear mirror and the front mirror, in which a laser material is filled;
    at least two wavelength selective elements disposed at an optical path of the laser beam between the rear mirror and the laser chamber;
    separating means for separating an output laser beam outputted from the front mirror into main peak components and sideband wave components;
    central wavelength detecting means for detecting a central wavelength of the main peak components of the output laser beam separated by the separating means;
    sideband wave power detecting means for detecting a power of the sideband wave components of the output laser beam separated by the separating means;
    first control means for controlling wavelength selective characteristics of the wavelength selective elements so that the value of the central wavelength detected by the central wavelength detecting means falls within a first desired allowable range; and
    second control means for controlling the wavelength selective characteristics of the wavelength selective elements so that the value of the sideband wave power detected by the sideband wave power detecting means becomes minimum.

2. A laser wavelength control apparatus according to claim 1, wherein the separating means includes a spectroscope, the central wavelength detecting means includes:
    a photodiode array for receiving the main peak components separated by the spectroscope; and
    means for detecting the central wavelength from a light-receiving channel composed of the photodiode array receiving the main peak components, and the sideband wave power detecting means includes:
    the photodiode array receiving the sideband wave components separated by the spectroscope together with the main peak components; and
    means for detecting the sideband wave power from an output level of the light-receiving channel of the sideband wave components.

3. A laser wavelength control apparatus according to claim 1, wherein the separating means includes a spectroscope, the central wavelength detecting means includes a position sensitive device for receiving the main peak components separated by the spectroscope and for detecting the central wavelength from the light-receiving position, and the sideband wave power detecting means includes a photodiode for receiving the sideband wave components separated by the spectroscope and for detecting the sideband wave power from the received light output.

4. A laser wavelength control apparatus according to claim 1, wherein the separating means includes a spectroscope and mirror means for taking out the sideband wave components from the light separated by the spectroscope, the central wavelength detecting means includes first light-receiving means for detecting the central wavelength from the main peak components separated by the spectroscope, and the sideband wave power detecting means includes second-light receiving means for detecting the sideband wave power from the sideband wave components taken out by the mirror means.

5. A laser wavelength control apparatus according to claim 1, wherein the separating means includes a spectroscope, the central wavelength detecting means includes light-receiving means for receiving the main peak components separated by the spectroscope, the sideband wave power detecting means includes:
    first light-receiving means for receiving the main peak components separated by the spectroscope;
    second light-receiving means for receiving the main peak components and the sideband wave components separated by the spectroscope; and
    means for detecting the sideband wave power from the difference between the received light output of the second light-receiving means and the received light output of the first light-receiving means.

6. A laser wavelength control apparatus according to claim 1, wherein the at least two wavelength selective elements comprise a first etalon having a large free spectral range and a second etalon having a small free spectral range, and wherein the first control means controls the wavelength selective characteristic of the second etalon, and the second control means controls the wavelength selective characteristic of the first etalon.

7. A laser wavelength control apparatus according to claim 1, wherein the control of the wavelength selective characteristics of the etalons by the first and second control means is effected by changing at least one selected from the angle, temperature, gap pressure and gap spacing of the etalons.

8. A laser wavelength control apparatus according to claim 1, wherein the separating means includes a spectroscope for separating the output laser beam into the main peak components and the sideband wave components, the spectroscope separating a light of higher order than second order.

9. A laser wavelength control apparatus, characterized by:
a rear mirror comprising a total reflection mirror;
a front mirror disposed opposite to the rear mirror, for permeating a part of laser beam;
a laser chamber disposed between the rear mirror and the front mirror, in which a laser material is filled;
two etalons disposed at an optical path between the rear mirror and the laser chamber;
means for detecting a central wavelength and a central wavelength power of an output laser beam outputted from the front mirror;
first control means for controlling a wavelength selective characteristic of one of the two etalons having the small free spectral range so that the central wavelength detected by the detecting means falls within a desired allowable range; and
second control means for controlling a wavelength selective characteristic of the other one of the two etalons so that the central wavelength power detected by the detecting means becomes maximum.

10. A laser wavelength control apparatus according to claim 9, wherein the detecting means includes a spectroscope for separating the main peak components from the output laser beam, and a one-dimensional light-receiving element for receiving the main peak components separated by the spectroscope and for detecting the central wavelength and the central wavelength power of the output laser beam.

11. A laser wavelength control apparatus according to claim 9, wherein the control of the wavelength selective characteristics of the etalons by the first and second control means is effected by changing at least one selected from the angle, temperature, gap pressure, and gap spacing of the etalons.

12. A laser wavelength control apparatus, characterized by:
a rear mirror comprising a total reflection mirror;
a front mirror disposed opposite to the rear mirror for permeating a part of laser beam;
a laser chamber disposed between the rear mirror and the front mirror, in which a laser material is filled;
at least two wavelength selective elements disposed at an optical path between the rear mirror and the front mirror;
reference beam generating means for generating a reference beam having a reference wavelength;
detecting means for receiving an output laser beam outputted from the front mirror together with the reference beam and for detecting a central wavelength of the output laser beam from a relative wavelength difference relative to the reference beam; and
control means for controlling wavelength selective characteristics of the wavelength selective elements so that the central wavelength detected by the detecting means falls within a desired allowable range.

13. A laser wavelength control apparatus according to claim 12, wherein the reference beam generating means comprises a mercury lamp.

14. A laser wavelength control apparatus according to claim 12, wherein the reference beam generating means comprises an argon ion laser.

15. A laser wavelength control apparatus according to claim 12, wherein the reference beam generating means comprises an argon ion laser and means for doubling the frequency of the output beam of the argon ion laser.

16. A laser wavelength control apparatus according to claim 12, wherein the detecting means comprises a spectroscope for detecting the output laser beam and the reference beam simultaneously.

17. A laser wavelength control apparatus according to claim 12, wherein the detecting means comprises a monitor etalon for detecting the output laser beam and the reference beam simultaneously.

* * * * *